United States Patent
Fujii

(10) Patent No.: US 8,070,191 B2
(45) Date of Patent: Dec. 6, 2011

(54) THREADED JOINT FOR STEEL PIPES

(75) Inventor: Takashi Fujii, Kainan (JP)

(73) Assignee: Sumitomo Metal Industries, Ltd., Osaka (JP)

(*) Notice: Subject to any disclaimer, the term of this patent is extended or adjusted under 35 U.S.C. 154(b) by 0 days.

(21) Appl. No.: 12/567,095

(22) Filed: Sep. 25, 2009

(65) Prior Publication Data

US 2010/0078935 A1   Apr. 1, 2010

Related U.S. Application Data

(63) Continuation of application No. PCT/JP2008/056146, filed on Mar. 28, 2008.

(30) Foreign Application Priority Data

Mar. 28, 2007 (JP) ................. 2007-084669

(51) Int. Cl.
F16L 15/00   (2006.01)

(52) U.S. Cl. ........................... 285/390; 285/333

(58) Field of Classification Search .......... 285/390, 285/355, 333, 334
See application file for complete search history.

(56) References Cited

U.S. PATENT DOCUMENTS

| | | | | |
|---|---|---|---|---|
| 859,643 A * | 7/1907 | Cummings | ............... | 72/96 |
| 859,803 A * | 7/1907 | Cummings | ............... | 285/114 |
| 929,027 A * | 7/1909 | Schuhmann | ............... | 285/333 |
| 2,056,112 A * | 9/1936 | Protin | ............... | 285/333 |
| 2,062,407 A * | 12/1936 | Eaton | ............... | 285/334 |
| 2,094,491 A * | 9/1937 | Janata | ............... | 285/333 |
| 2,183,644 A * | 12/1939 | Frame | ............... | 285/333 |
| 2,204,754 A * | 6/1940 | Frame | ............... | 285/334 |
| 2,340,706 A * | 2/1944 | Somes | ............... | 285/333 |
| 2,641,488 A * | 6/1953 | Dunn et al. | ............... | 285/333 |
| 2,907,589 A * | 10/1959 | Knox | ............... | 285/95 |
| 3,047,316 A * | 7/1962 | Wehring et al. | ............... | 285/334 |
| 4,494,777 A * | 1/1985 | Duret | ............... | 285/55 |
| 4,958,862 A * | 9/1990 | Cappelli et al. | ............... | 285/334 |
| 4,984,829 A * | 1/1991 | Saigo et al. | ............... | 285/334 |
| 5,492,375 A * | 2/1996 | Smith | ............... | 285/334 |
| 5,649,725 A * | 7/1997 | Nagasaku et al. | ............... | 285/334 |
| 5,829,797 A * | 11/1998 | Yamamoto et al. | ............... | 285/333 |
| 6,454,315 B1 * | 9/2002 | Yamaguchi | ............... | 285/334 |
| 7,494,159 B2 * | 2/2009 | Sugino et al. | ............... | 285/334 |
| 2005/0093250 A1 * | 5/2005 | Santi et al. | ............... | 277/602 |
| 2006/0006648 A1 * | 1/2006 | Grimmett et al. | ............... | 285/333 |
| 2007/0029797 A1 * | 2/2007 | Santi et al. | ............... | 285/333 |
| 2007/0228729 A1 * | 10/2007 | Grimmett et al. | ............... | 285/333 |
| 2010/0038904 A1 * | 2/2010 | Yamamoto et al. | ............... | 285/390 |
| 2010/0078936 A1 * | 4/2010 | Nakamura et al. | ............... | 285/334 |
| 2010/0171306 A1 * | 7/2010 | Gillot et al. | ............... | 285/334 |

FOREIGN PATENT DOCUMENTS

| | | |
|---|---|---|
| JP | 2-100821 | 4/1990 |
| JP | 4-46712 | 2/1992 |
| JP | 5-269622 | 10/1993 |
| JP | 9-207027 A | 8/1997 |
| JP | 2000-24896 | 1/2000 |

* cited by examiner

*Primary Examiner* — Aaron Dunwoody
(74) *Attorney, Agent, or Firm* — Clark & Brody

(57) ABSTRACT

A threaded joint for steel pipes comprises a pin having male threads and a box having female threads which engage with the male threads. An incomplete thread is formed at the start of the male threads and the incomplete thread has a portion in which the angle $\theta$ formed between its crest face and its flank on the side facing a complete thread is an obtuse angle and in which the thread height h from the base of the flank is at least 0.2 mm.

5 Claims, 3 Drawing Sheets

(a)

(b)

(a)

(b)

US 8,070,191 B2

THREADED JOINT FOR STEEL PIPES

This application is a continuation of International Patent Application No. PCT/JP2008/056146, filed Mar. 28, 2008. This PCT application was not in English as published under PCT Article 21(2).

TECHNICAL FIELD

This invention relates to a threaded joint for steel pipes for connecting steel pipes such as OCTG (oil country tubular goods) used for the exploration for and production of natural gas and crude oil produced underground (beneath the surface of the land or beneath the surface of the sea). A threaded joint for steel pipes according to the present invention is particularly characterized by the thread shape of an incomplete thread which is formed at the start of cutting of tapered male threads.

BACKGROUND ART

OCTG used in the exploration for natural gas wells and oil wells (collectively referred to below as oil wells) and production of natural gas and crude oil are steel pipes having a length of around 10 meters. In use, they are connected to each other by threaded joints until they have a length which can reach an underground oil field. In recent years, due to increases in the depth of oil wells (such as to 8,000 meters or more) and increases in the numbers of extended reachwells and horizontal wells, the number of OCTG which are connected together is continuing to increase.

Threaded joints for connecting steel pipes typically have a pin-box structure constituted by a pin having male (external) threads and a box having female (internal) threads. Types of threaded joints include integral types in which a pin is formed on one end of a steel pipe and a box is formed on the other end of the pipe and two pipes are directly connected to each other, and coupling types in which two pipes each having a pin formed on both ends thereof are connected through a coupling having a box formed on both of its ends.

A special threaded joint capable of metal-to-metal sealing is widely used as a threaded joint for OCTG which is required to exhibit good sealing performance (gas tightness) even under a high pressure and a high load. FIG. 2 is an explanatory view showing a cross section of the pin of a special threaded joint of the coupling type, i.e., the cross section of the pin formed on one end of an oil country tubular good (a steel pipe). This pin has tapered male threads 1 formed on the outer peripheral surface of its end portion and a lip 2 which is located closer to the end surface of the pin than the tapered male threads 1. The lip 2 has a tapered metal seal portion 2a formed on its outer peripheral surface to perform metal-to-metal sealing and a torque shoulder 2b formed on its end surface.

The tapered male threads of the pin are formed by rotating a steel pipe which is used as an oil country tubular good while holding the vicinity of the end of the steel pipe with a chuck, and allowing a thread cutting tool to contact the peripheral surface of the end portion of the rotated steel pipe. Tapered male threads 1 which are formed in this manner on the pin have an incomplete thread portion (a threaded portion where the thread shape is incomplete, i.e., a threaded portion where the shape of the thread is different from that of a complete thread) at the start of cutting 1a and at the end of cutting 1b. The burrs easily develops on the crest of such an is incomplete thread.

FIG. 3 schematically shows the shape of various types of burrs which can develop at the start of cutting of threads. In FIG. 3, 3 indicates a burr, 4 indicates a thread, the 2-dash chain line indicates the shape of an imaginary thread assuming that the incomplete thread formed at the start of cutting where a burr 3 developed is actually a complete thread, and the dashed line shows the direction of machining of threads. As shown in FIG. 3, burrs 3 which can develop on an incomplete thread portion at the start of thread cutting include a burr which does not lean towards the root of thread 4 and which does not project beyond the thread height of an imaginary complete thread (FIG. 3(a)), a burr which leans towards the root of thread 4 (FIG. 3(b)), and a burr which projects towards the imaginary thread and exceeds the height of the imaginary thread (FIG. 3(c)). Of these burrs, according to VAM, a specification for a special threaded joint, a burr like that shown in FIG. 3(b) which leans towards the root of thread 4 or a burr like that shown in FIG. 3(c) which projects towards an imaginary thread beyond the height of the imaginary thread is considered unacceptable.

In thread cutting of a special threaded joint, in order to suppress burrs 3 which develop in the incomplete thread portion formed at the start of thread cutting and which easily cause galling, when performing finish cutting of male threads with a thread cutting tool referred to as a chaser, as shown in FIG. 4, a portion of the threads to be cut in the beginning is cut so as to have a bevel shape (having a triangular cross section with a sloping surface). The portion of the threads which is finished to have a bevel shape (1c in FIG. 4) is referred to as a beveled portion. Also in this description, this portion will be referred to below as a beveled portion.

Even in the case where such a beveled portion is formed, as shown in FIGS. 4 and 5, burrs 3 end up developing on the beveled portion 1c and are found at the completion of machine cutting of the tapered male threads 1. This is because thread cutting of a threaded joint for OCTG is carried out using a chaser having a cutting blade capable of cutting two or three threads simultaneously. Therefore, a large cutting load is applied, and as shown in FIG. 5(a), the height of the burrs 3 is large also in the beveled portion.

Burrs 3 on the beveled portion 1c which protrude towards the height of s thread 4 as shown in FIG. 5(a) are manually removed using a deburring tool called a buff grinder. However, since such burrs have a large height, it is difficult to completely remove them using a buff grinder, and as shown in FIG. 5(b), burrs often remain partially. In addition, manual deburring is poor in working efficiency and it may involve the risk of imparting grinding scratches to the metal seal portion or the complete thread, which must not be ground.

JP 09-207027A proposes that burrs formed on a beveled portion can be eliminated using a chaser having a prescribed radius of curvature R of its edge portion. However, it is not possible to completely remove only the burrs which developed on a beveled portion during thread cutting even if the chaser proposed in that patent document is used.

DISCLOSURE OF INVENTION

This invention provides a threaded joint for steel pipes which makes it possible to efficiently remove burrs from a beveled portion which is formed at the start of thread cutting without scratching the metal seal portion or the complete thread. Such removal was impossible in thread cutting of a conventional threaded joint for OCTG.

A threaded joint for steel pipes according to the present invention which can prevent the occurrence of burrs on an incomplete thread formed at the start of thread cutting, such burrs having a tendency to easily cause galling during makeup of a threaded joint for OCTG, comprises a pin having male threads and a box having female threads which engage with the male threads, and it is characterized in that the incomplete thread formed at the start of cutting of the male threads has a portion in which the angle formed between the crest face of the incomplete thread and its flank on the side facing a complete thread is an obtuse angle and in which the height of the incomplete thread from the base of the flank is at least 0.2 mm. This portion preferably extends along at least 25% and more preferably at least 50% of the circumference (one turn) of the threads.

The shape of the incomplete thread formed at the start of cutting of the male threads of a threaded joint for steel pipes according to the present invention is schematically shown in FIG. 1(b). An incomplete thread is indicated by 11. The angle θ which is formed between the crest face 11c of this incomplete thread 11 and the flank 11b of the thread 11 on the side facing a complete thread which is a portion including only complete thread 12 is an obtuse angle, and the thread height h of the incomplete thread from the base of the flank 11b is at least 0.2 mm. This thread shape of the incomplete thread is formed by cutting off the upper or top portion of the beveled portion of an incomplete thread 11 (shown by the dashed line) by machine cutting.

If the angle θ formed between the crest face 11c of an incomplete thread 11 formed at the start of cutting of the male threads with respect to the flank 11b on the side facing the complete thread is an acute angle, there is a possibility of burrs again developing in the locations which are cut off. If the thread height h of the incomplete thread 11 from the base of its flank 11b on the side facing the complete thread is less than 0.2 mm, there is a possibility of scratching the root of an complete thread when the shape of the incomplete thread is formed, for example, by cutting in the manner described below.

In a threaded joint for steel pipes according to the present invention, a thread having a trapezoidal shape with its crest face having a prescribed height and angle is formed by cutting off the top portion of a pointed crest of an incomplete thread typically having a beveled portion formed at the start of cutting of the male threads. This cutting off of the top portion is preferably carried out under the same feed conditions as in machine cutting of the male threads. As a result, the top portion of a thread including burrs can be efficiently cut off without scratching the metal seal portion or the complete thread, and galling at the time of makeup and breakout of OCTG using a threaded joint can be prevented.

BRIEF EXPLANATION OF THE DRAWINGS

FIG. 1(a) shows the state at the start of a cutting operation to cut off a thread with a pointed crest, and FIG. 1(b) shows the state at the completion of the cutting operation to cut off a pointed thread.

FIG. 5(a) shows a burr which developed, and FIG. 5(b) shows a burr remaining after a burr removal operation using a buff grinder.

BEST MODE FOR CARRYING OUT THE INVENTION

Below, a preferred embodiment of the present invention will be explained while referring to FIG. 1.

Figure 1:
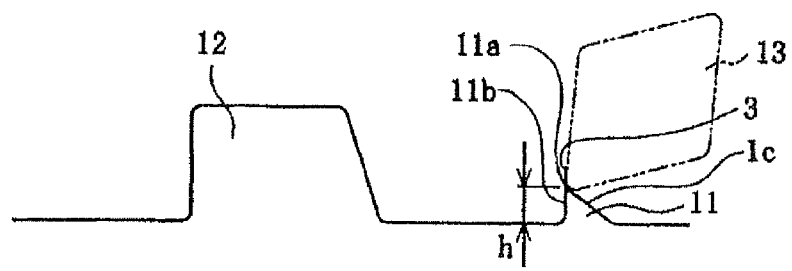
FIG. 1 is a schematic cross-sectional view showing an incomplete thread formed at the start of cutting of tapered male threads as compared with a complete thread in a threaded joint for steel pipes according to the present invention.
Figure 1:
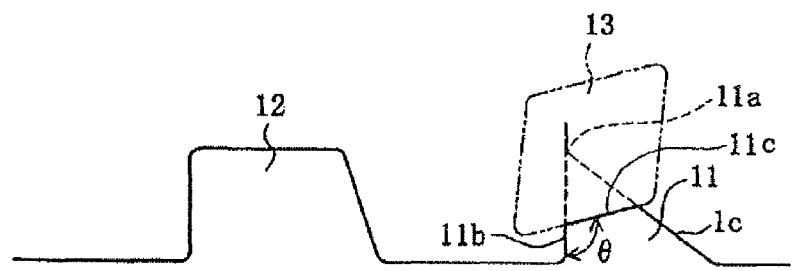
Figure 2:
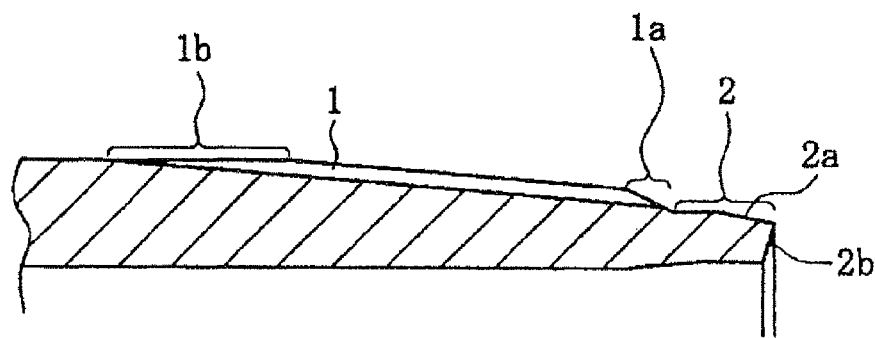
FIG. 2 is a schematic cross-sectional view of a pin formed on the end of a steel pipe in a coupling-type threaded joint for steel pipes.
Figure 3:
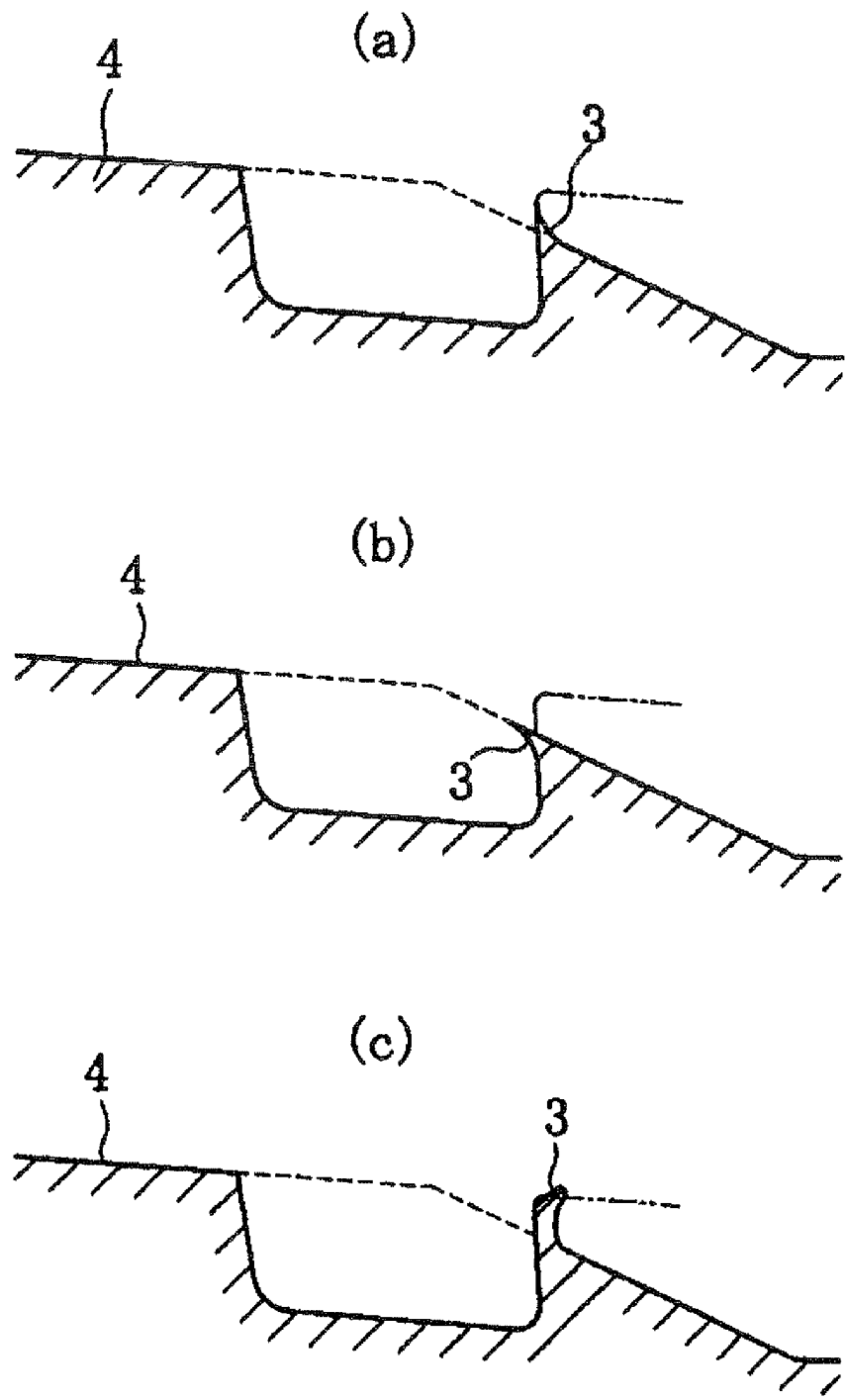
FIG. 3 is an explanatory view showing various types of burrs which are formed on an incomplete thread at the start of cutting of male threads.
Figure 4:
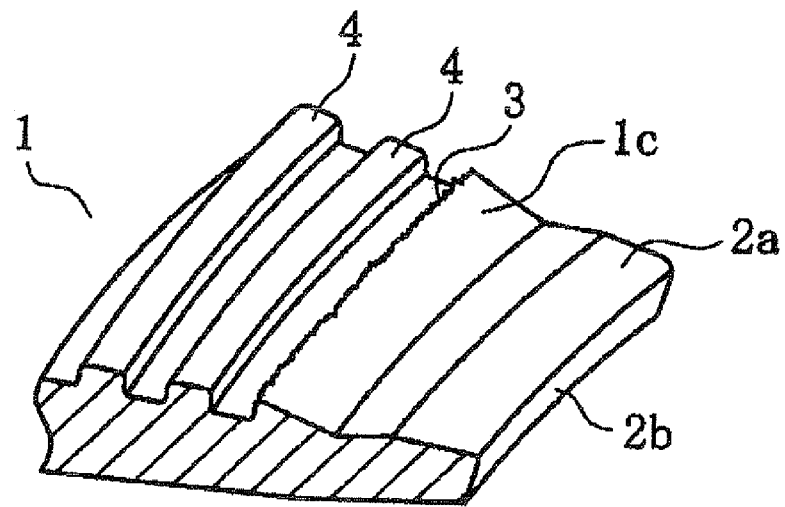
FIG. 4 is an explanatory view showing a beveled portion which is formed in an incomplete thread at the start of cutting of male threads and burrs which developed on the beveled portion.
Figure 5:
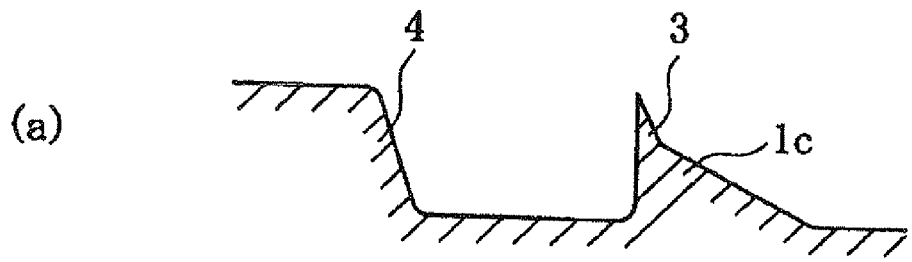
FIG. 5 is an explanatory view of burrs which developed on a beveled portion at the start of cutting of male threads.
Figure 5:
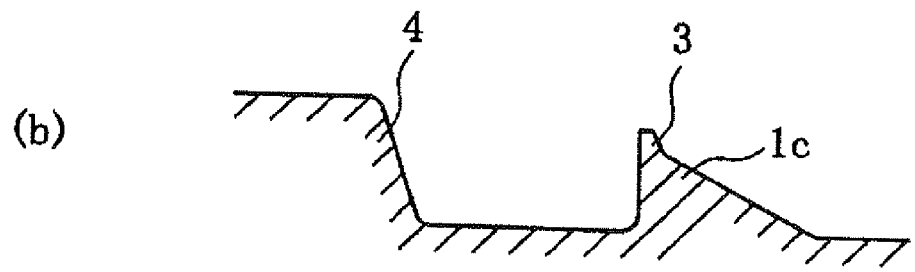

FIG. 1 is a schematic cross-sectional view showing an incomplete thread, which is an important structural feature of a threaded joint for steel pipes according to the present invention, formed at the start of cutting of tapered male threads and comparing it with a complete thread. FIG. 1(a) shows the state at the start of machining to cut off a portion of an incomplete thread with a pointed crest, and FIG. 1(b) shows the state at the completion of this machining. Since the male threads of the pin are tapered threads as stated above, the crest faces or the roots of the male threads and normally both are not parallel to the longitudinal axis of the pin but are sloping with a diameter which gradually decreases towards the tip of the pin (see FIGS. 3 and 4). However, in order to simplify the drawings, the taper is omitted from FIG. 1.

In FIG. 1, 11 is a thread (referred to below as a beveled thread) having a generally triangular cross section with a pointed crest which is formed in a beveled portion 1c which is an incomplete thread portion, and 12 is a thread formed in a complete thread portion. When forming a beveled portion at the start of cutting of male threads, the height of the resulting beveled thread gradually increases as thread cutting proceeds and reaches the height of the complete thread. At this point, the crest of the thread undergoes machining to form a crest face, and the thread shape then approaches the shape of the complete thread. Namely, the height of the beveled thread is initially low as shown in FIG. 1(a), and it finally reaches the same height as a complete thread as shown in FIG. 1(b).

As shown by the solid line in FIG. 1(a) and the dashed line in FIG. 1(b), burrs projecting toward the height of the thread tend to easily form on the pointed crest 11a of the beveled thread 11. If such burrs projecting toward the height of the thread extends beyond the height of the complete thread as shown in FIG. 1(b), the burrs can easily cause galling at the time of makeup and breakout of a threaded joint. According to the present invention, by cutting off the burrs under the same feed conditions as in thread cutting of the male threads, the top portion of the beveled thread is removed along with any burrs formed thereon, thereby making it possible to prevent galling caused by burrs.

As a result of the top portion of the beveled thread 11 being cut off, the beveled thread takes on a thread shape having a crest face (top face). The thread shape which is formed by cutting off the top portion in this manner is made such that the angle θ formed between the crest face 11c and the flank 11b on the side facing the complete thread is an obtuse angle and that the thread height h from the base of this flank 11b is at least 0.2 mm. The height h can be set so that burrs which extend beyond the thread height of the complete thread are completely removed, and there is no particular upper limit on the height h. However, usually it is at most 1 mm, preferably it is at most 0.8 mm, and more preferably it is at most 0.5 mm.

When the height of the beveled thread 11 of the beveled portion has reached a prescribed height h of at least 0.2 mm (see FIG. 1(a)), machining to cut off the top portion of the beveled thread begins. The cutting tool contacts the beveled thread at an angle such that the angle θ between the thread crest face formed by is cutting and the thread flank on the side facing the complete thread is an obtuse angle. The feed rate of the cutting tool used to cut off the upper portion of the beveled thread is preferably the same as the feed rate for cutting the male threads so that the top of the beveled thread can be cut off while maintaining the front surface of the cutting tool for the beveled thread alongside the flank 11b of the beveled thread. As a result, scratching of the metal seal portion or the complete thread when cutting off the upper portion of a thread 11 of the incomplete thread portion having a pointed crest 11a can be prevented with certainty.

Cutting of the upper portion of the beveled thread starting from the position shown in FIG. 1(a) is preferably completed before the tip of the blade of the cutting tool contacts the root of the male threads, for example, when the tip of the blade reaches a position at approximately ¾ of the pitch of the male threads from the above-described starting position of cutting (see FIG. 1(b)). However, it is also possible to cut off the upper portion of the threads of the beveled portion over the entire length of the beveled portion.

Cutting of the upper portion of the beveled threads can be carried out using a general-purpose diamond-shaped cutting tip 13 which is used to form a lip of a pin having a metal seal portion and a torque shoulder.

In the past, in order to prevent burrs from leaning over, the beveled portion and the lip were separately machined, or the beveled portion was machined at a lower speed. However, if the beveled thread portion in the incomplete thread formed at the start of cutting has a shape in which its upper portion is cut off in accordance with the present invention, a countermeasure against burrs becomes unnecessary when machining to form the beveled portion, and it is possible to perform machining of the beveled portion at the same high speed as for the lip without worrying about the occurrence of burrs.

In the present invention, machining which cuts off the upper portion of a beveled portion of an incomplete thread at the start of cutting is an extra process compared to in the past. However, as stated above, machining of the beveled portion can be carried out at the same high speed as machining of the lip, so the cycle time is approximately the same as in the past.

The present invention is not limited to the above-described embodiment, and it is of course possible to suitably modify a mode for carrying out the present invention as long as it falls within the technical scope defined by the claims.

For example, while referring to FIG. 1, an embodiment has been described in which a beveled portion having a pointed crest is formed in an incomplete thread at the start of cutting, but it is not always necessary to form such a beveled portion. It is possible to form an incomplete thread with a pointed crest by a method other than bevel formation.

The present invention has been explained above taking a coupling-type threaded joint for steel pipes as an example, but the present invention can be applied to an integral threaded joint for steel pipes, and it can be applied to any other type of threaded joint for steel pipes which could undergo galling due to the formation of burrs. In addition, the present invention is applied to tapered male threads on the pin of a threaded joint for steel pipes, but the invention can be applied in the same manner to tapered female threads of a box.

The invention claimed is:

1. A threaded joint for steel pipes comprising a pin having male threads and a box having female threads which engage with the male threads, characterized in that an incomplete thread formed on an end of the male threads on a side closer to a tip of the pin has a crest face, a flank on a side facing toward complete threads of the male threads, and a beveled portion facing the tip of the pin, in which an angle θ formed between the crest face and the flank is an obtuse angle and in which the thread height h from the base of the flank is at least 0.2 mm.

2. A threaded joint for steel pipes as set forth in claim 1 wherein the portion of the incomplete thread for which the angle θ formed between its crest face and its flank on the side facing a complete thread is an obtuse angle is formed by cutting off a portion of an incomplete thread with a pointed crest having a generally triangle cross section.

3. A threaded joint for steel pipes as set forth in claim 2 wherein cutting off of a portion of the thread is carried out by cutting under the same feed conditions as cutting of the male threads from the side of starting point of cutting the male threads.

4. A threaded joint for steel pipes as set forth in claim 2 wherein a beveled portion is formed on the incomplete thread at the start of cutting.

5. A threaded joint for steel pipes as set forth in claim 3 wherein a beveled portion is formed on the incomplete thread at the start of cutting.

* * * * *